United States Patent
Quach et al.

(10) Patent No.: US 6,802,039 B1
(45) Date of Patent: Oct. 5, 2004

(54) USING HARDWARE OR FIRMWARE FOR CACHE TAG AND DATA ECC SOFT ERROR CORRECTION

(75) Inventors: Nhon Quach, San Jose, CA (US); Jeen Miin, Fremont, CA (US)

(73) Assignee: Intel Corporation, Santa Clara, CA (US)

(*) Notice: Subject to any disclaimer, the term of this patent is extended or adjusted under 35 U.S.C. 154(b) by 471 days.

(21) Appl. No.: 09/608,486

(22) Filed: Jun. 30, 2000

(51) Int. Cl.[7] .......................... G11C 29/00; G06F 11/00
(52) U.S. Cl. ............................. 714/763; 714/5; 714/10; 712/220
(58) Field of Search ................................. 714/763, 2, 3, 714/4, 5, 6, 756, 762, 48, 10–12; 360/40; 712/20, 43, 229; 700/3–5

(56) References Cited

U.S. PATENT DOCUMENTS

| | | | | |
|---|---|---|---|---|
| 5,274,799 A | * | 12/1993 | Brant et al. ..................... 714/6 |
| 5,381,544 A | * | 1/1995 | Okazawa et al. ............... 714/5 |
| 6,327,690 B1 | * | 12/2001 | Zhang et al. ................ 714/769 |
| 6,625,749 B1 | * | 9/2003 | Quach ......................... 714/10 |

* cited by examiner

Primary Examiner—Emmanuel L. Moise
(74) Attorney, Agent, or Firm—Blakely, Sokoloff, Taylor & Zafman LLP (57) ABSTRACT

A method and an apparatus for error detecting and error recovering in a processor are described. In one embodiment, a system includes at least one cache, one execution unit, and an error detecting and recovering device. The error detecting and recovering device monitors information transferred between the processor components, such as a cache and an execution unit. Once an error is identified, the error detecting and recovering device suspends processor execution. After the error is recovered, the processor execution is resumed.

22 Claims, 6 Drawing Sheets

USING HARDWARE OR FIRMWARE FOR CACHE TAG AND DATA ECC SOFT ERROR CORRECTION

BACKGROUND OF THE INVENTION

1. Field of the Invention

The present invention relates generally to the field of computer systems and, more specifically, the present invention relates to a method of error corrections.

2. Description of the Related Art

Scaling technology improves overall system performance by increasing transistor density and reducing power consumption. Increasing transistor density, however, also increases soft (or transient) errors. A soft error occurs when a logical value of a memory cell or a logic element is erroneously changed to the opposite logical value as a result of cosmic radiation and/or alpha particle bombardment. Future process technology will enable more and more devices with finer geometry to be packed on a single die. This trend will increase the soft error rate significantly.

Storage elements in a microprocessor are sensitive to soft errors. To improve processor performance, modern processors are often built with on-chip caches. With increasing integrated circuit density, on-chip caches are increasingly sensitive to these soft errors. Thus, soft errors may corrupt logic values or data stored in the caches, which may affect the correct operation of the system. In the past, soft errors are typically left unprotected because they are difficult to protect and were not as severe a problem. With more advanced scaling technology, these soft errors can no longer be ignored.

BRIEF DESCRIPTION OF THE DRAWINGS

The present invention is illustrated by way of example and not limitation in the figures of the accompanying drawings in which like references indicate similar elements and in which.

DETAILED DESCRIPTION

A method and apparatus for cache tag and data soft error correction is described. More specifically, a scheme is described below that recovers from a tag and/or data ECC error. In one embodiment, the scheme is software-based and is transparent to the operating system (OS) (i.e., can be done without OS intervention). Such a scheme may be used with cache memories that employ ECC protection in the tag, data, or both.

For purposes of explanation, in the following description, numerous specific details are set forth in order to provide a thorough understanding of the present invention. It will be apparent, however, to one skilled in the art that the present invention can be practiced without these specific details. In other instances, well-known structures and devices are shown in block diagram form in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise in the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Overview

A mechanism of soft error detection and subsequent soft error correction is described. In one embodiment, the mechanism is used for cache tag and data ECC soft error correction. For ECC protection of the data and/or tag, a set of ECC check bits is used. In one embodiment, additional parity bits are stored with the data and tag (e.g., 2 parity bits for each data or tag array). A parity checker or EC error detector may be used to detect an error. On detecting such an error, a firmware or hardware error correction scheme may be used.

In one embodiment, an error detecting and recovering device ("EDRD") provides an error detecting procedure to monitor information that is to be transferred between the components, such as for example, between a cache and an execution unit. The error may be detected in the data and/or tag of an entry in the L2 cache during an access. In one embodiment, the error detecting procedure performs error checking on tags and data in an L2 cache using a bus controller on the processor. Once an error is detected, the EDRD suspends the information transfer and invokes error recovery procedures to correct the error. The EDRD may include part of the bus controller, and such a part of the bus controller may cause the error recovery and suspension operations to be invoked. Once the error is corrected, the EDRD resumes the suspended processor operation.

Figure 1:
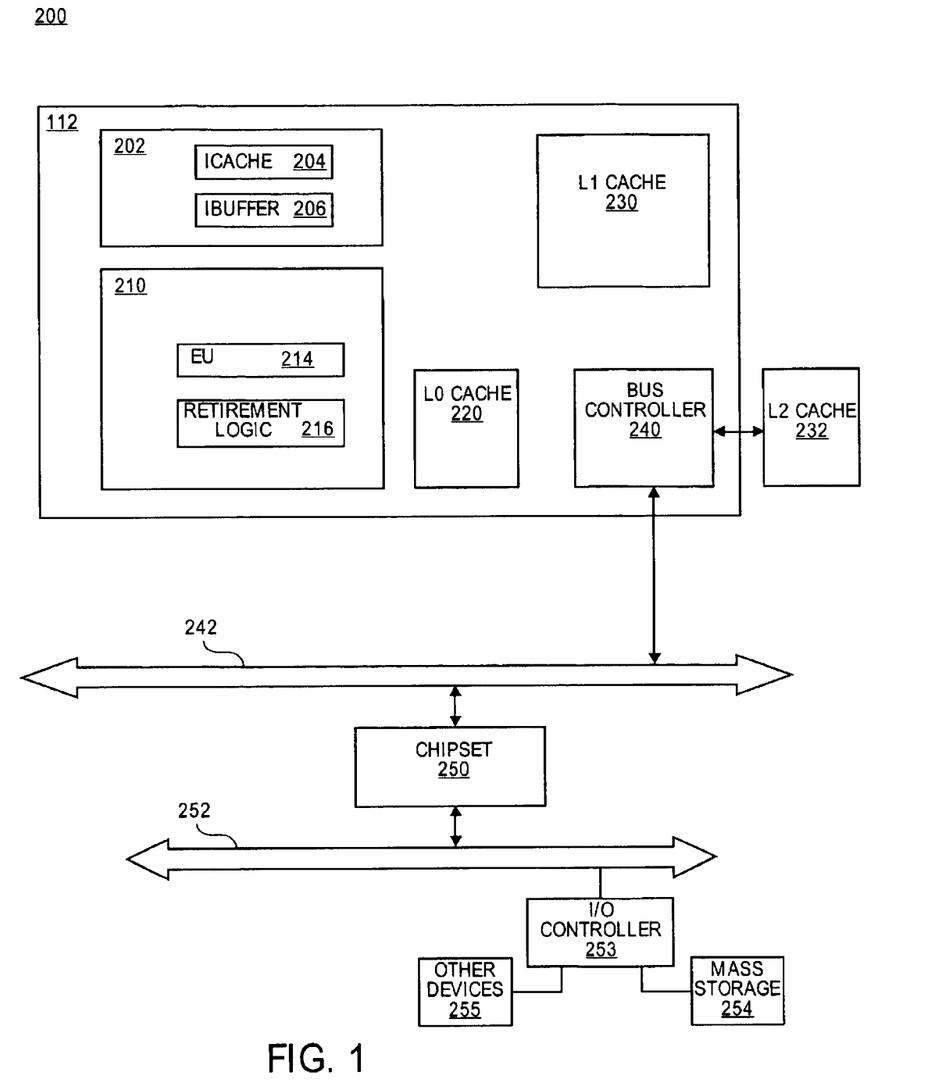
FIG. 1 illustrates one embodiment of a processor containing multiple components including an error check device.

FIG. 1 is a block diagram of one embodiment of a system 200. System 200 contains a processor 112, level two (L2) cache 232, a front side bus 242, and chipset 250, a local bus 252 (e.g., PCI bus), an input/output (I/O) controller 253, mass storage 254, and one or more other devices 255.

In one embodiment, processor 112 comprises a front end 202, a back end 210, a level zero (L0) cache 220, a level one (L1) cache 230, and a bus controller 240. Front end 202 further contains instruction cache (Icache) 204 and instruction buffer (Ibuffer) 206. Icache 204 and Ibuffer 206 are temporary storage locations for storing instructions. Back end 210 also includes an execution unit (EU) 214 and retirement logic 216. Other functional units are typically included but have been omitted to avoid obscuring the present invention.

For one embodiment, processor 112 executes instructions. Front end 202 fetches a set of instructions from L1 cache 230 and stores the fetched instructions in Icache 204. If the instructions are not found in L1 cache 230, the processor may either go to L2 cache 232 or the main memory (not shown) to find the next set of instructions. Bus controller 240 performs the access to L2 cache 232. For one embodiment, when a set of instructions is found, processor 112 loads the instructions to Ibuffer 206 for execution. Back end 210 receives instructions from Ibuffer 206 for execution by execution unit 214.

Figure 2:
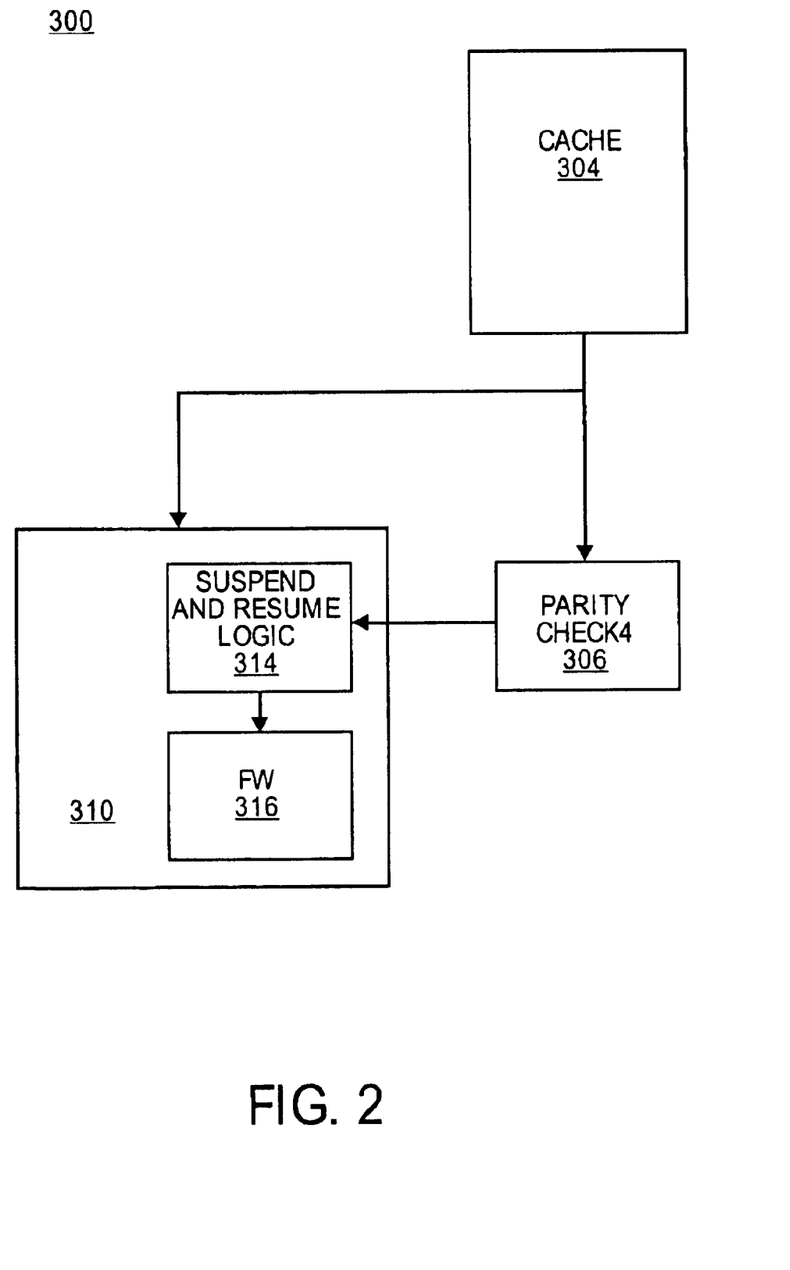
FIG. 2 illustrates one embodiment of an error check and recovery system using ECC firmware.

FIG. 2 illustrates a block diagram of a portion of processor that uses hardware ECC to detect and firmware to recover errors. The portion shown includes an a cache 304, a parity checker 306, and an execution unit 310. Cache 304 may contain data or instruction or mixed data and instruction. Execution unit 310 further includes suspense and resume logic 314 and a firmware block 316. For this embodiment, data stored in cache 304 is fetched by execution unit 310 before it is executed. It is apparent to one of ordinary skill in the art the other functional units may be included.

In one embodiment, the EDRD comprises parity checker 306, suspense logic 314, and firmware block 316. Parity checker 306 checks the parity of both tag and data to determine whether the information in cache 304 contains an error. An ECC checker may also be used instead of a parity checker. In one embodiment, a parity checker is used to detect errors in the tag and an ECC checker is used to detect errors in the data. Suspense logic 314 suspends the current processor operation of fetching the information and all processing related to it when parity checker 306 detects an error. Once the current operation is suspended, firmware block 316 initiates a firmware ECC recovery process to recover, or correct, the error.

The cache keeps ECC or parity bits in the cache. On each access, hardware will check if there is parity error in the tags or ECC errors in the data. If there is an error, the hardware correction state machine fixes the errors. In a software scheme, an MCA will be signaled and execution control will be passed to the firmware in FIG. 2. Note that this firmware may be on chip (as on-chip microcode) or off-chip as stated above.

In one embodiment, the firmware ECC recovery process comprises the following operations. In one embodiment, the firmware may be in the processor, or an alternative, in the system memory. First, the firmware ECC flushes or empties the execution core pipeline or processing pipeline to avoid the error being passed onto other execution units and updating the register file of the processor. At the same time, the firmware ECC also suspends the cache access. In one embodiment, the external snoop operations are also held off by the firmware ECC. Once the pipeline is flushed and snoop operations are stopped, the processor logs the error in a machine specific register (MSR) and signals a machine check (MCA). The processor then invokes the machine check handler. In on embodiment, the machine check handler runs in uncacheable space and does not use any of the on-chip caches.

Using the MSR, the firmware performs an error correction action. In one embodiment, for each way of a cache line, the firmware computes the ECC syndrome bit, corrects the data, and writes the corrected data back into the caches. The firmware then reads the corrected data back to ensure that the errors are indeed correctable. The EDRD then releases the cache suspension.

Alternatively, in one embodiment, cache 304 receives an instruction from instruction 302 and the instruction is subsequently passed to parity checker 306 as well as execution unit 310 through cache 304. If parity checker 306 detects no errors, execution unit 310 executes the instruction and proceeds to the next instruction. However, parity checker 306 detects an error, it signals to suspend logic 314 that an error has been discovered. Suspend logic 314 subsequently suspends the current processor execution and informs the firmware 316 to correct the error.

Figure 3:
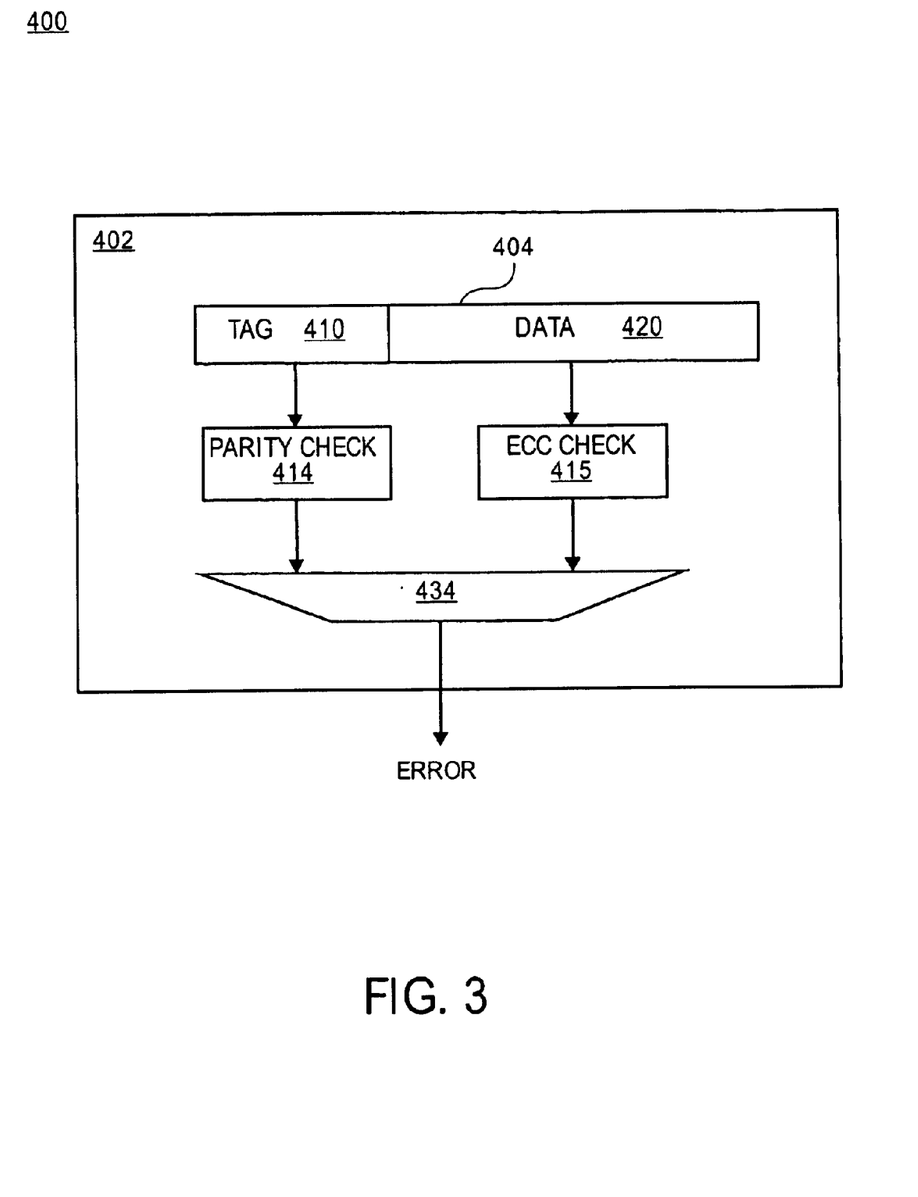
FIG. 3 illustrates one embodiment of an error detecting configuration in a cache memory.

FIG. 3 illustrates one embodiment of a parity checker 400, which includes a data register 404, parity checker 414–415, and a multiplexor 434. The register 404 is further divided into a tag portion 410 and a data portion 420. Multiple data registers may be added to parity checker 402.

Data portion 420 stores a copy of data while tag portion 410 stores the a tag associated with the data. For one embodiment, each of tag portion 410 and data portion 420 contains a parity bit. Parity checker 414 detects any parity error for tag portion 410 and parity checker 415 detects any parity error for data portion 420. Multiplexor 434 merges the outputs from parity checkers 414–415 into a single output. The output of multiplexor 434 is the output of the parity checker 402, which indicates whether there is a parity error or not.

In one embodiment, a hardware error correction scheme is used. In such a scheme, the processor implements a hardware state machine to perform the same function as the firmware. The same algorithm may be used as in the firmware error correction scheme with the exception of having the hardware error correction finite state machine perform the error correction action and perform the other functions that are normally performed by the firmware. The firmware error correction is typically more efficient and less hardware complex. Firmware correction is typically more efficient in terms of the silicon area that is required. However, the hardware error correction scheme is more transparent and more widely applicable as certain applications cannot afford to have the cache memories freeze for too long a period (and the firmware error recovery latency may be too long in certain situations).

Figure 4:
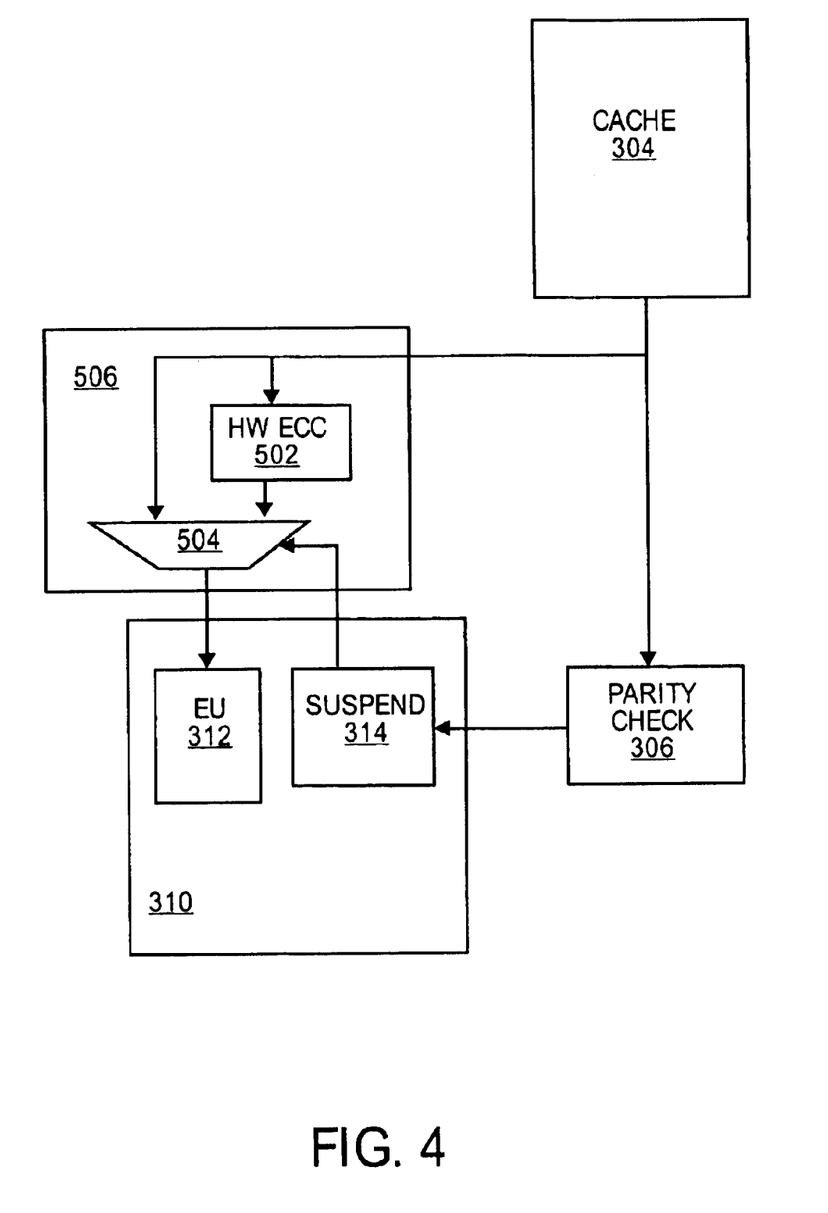
FIG. 4 illustrates one embodiment of an error check and recovery system using ECC hardware.

FIG. 4 illustrates one embodiment of a hardware error correction scheme mechanism for detecting and recovering errors. The scheme is similar to device 300 shown in FIG. 2 except a hardware error correction (EC) unit 502 and a selector 504.

In one embodiment, hardware EC unit 502 is capable of performing an error correction operation on the data from cache 304. Hardware ECC 502 may be a high-speed conventional even or odd hardware EC unit circuit. Selector 504 includes two inputs and one output wherein the first input is fed from cache 304 and the second input is fed from hardware EC unit 502. Selector 504 also receives a control signal from suspend logic 314, which signals selector 504 as to which one of two inputs to select. The output of the selector 504 is fed to execution core 310.

In one embodiment, selector 504 either selects the data from cache 304 or from hardware EC unit 502 according to halt block 314. For example, if suspend logic 314. The output of hardware ECC 502 produces the corrected data if the data is correctable. For example, if the control signal is one or logic 1 state, which indicates there is an error, selector 504 selects the corrected data from hardware ECC 502 as the output of selector 504. On the other hand, if halt 314 is 0, which indicates that there are no error, selector 504 selects the data from cache 304 as its output. The output of selector 504 is passed onto an execution unit in execution core 310.

Figure 5:
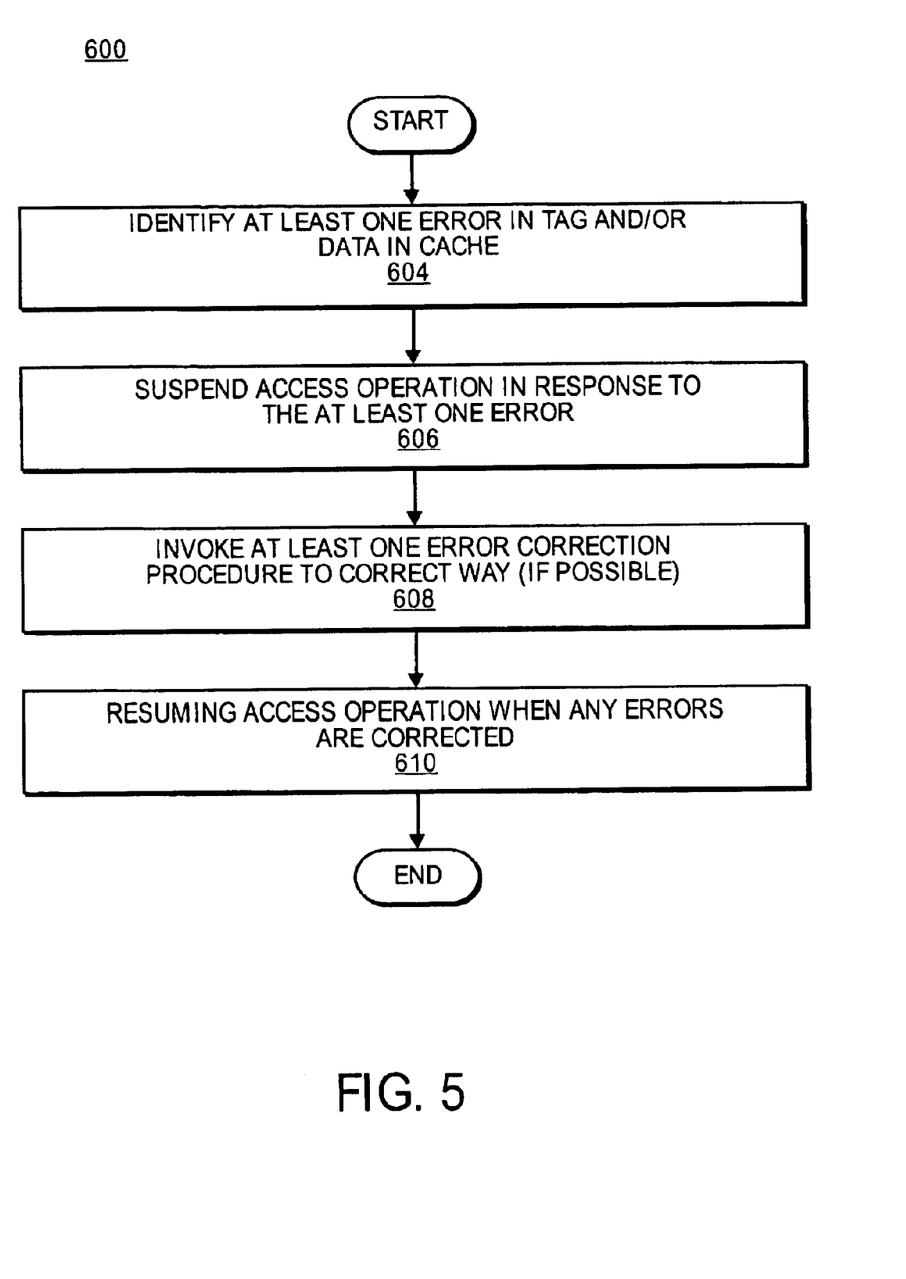
FIG. 5 is a flowchart illustrating an embodiment of an error correcting process for recovering an error.

FIG. 5 is a flowchart 600 illustrating an embodiment of an error correction process that is used in response to an error detection. Referring to FIG. 5 at block 604, the process identifies at least one error from the information that is being accessed or requested for access. At block 606, the process suspends the access operation in response to the detected error. Note that some processor operations may continue; however, access to the cache having the error(s) may be prevented until correction of the error(s). At block 608, the process invokes at least one error correction procedure to correct a detected error. In one embodiment, the error correction procedure is implemented by a firmware EC scheme. In an alternative embodiment, the error correction procedure is implemented by a hardware EC scheme. At block 610, the process resumes the access operation once the error is recovered.

Figure 6:
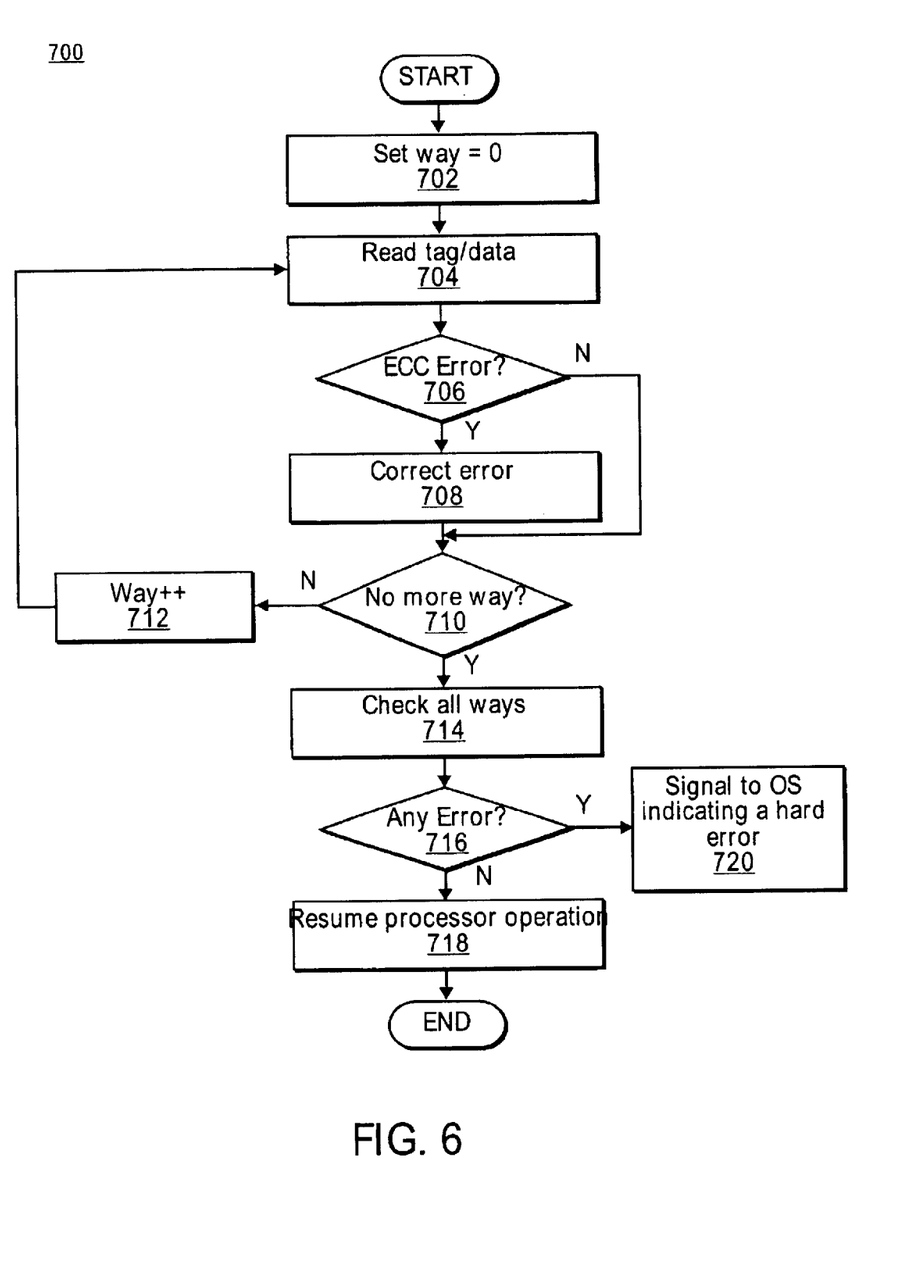
FIG. 6 is a flowchart illustrating an embodiment of a recovery process.

FIG. 6 is a flowchart 700 illustrating an embodiment of a recovery process. At block 702, the process sets a variable way equal to zero. The way variable indicates the number of reading ports on a cache.

At block 704, after resetting the counter and way variables, the process reads both the tag and data of the cache entry.

At block 706, the process examines whether an ECC error has occurred and whether the EC routine needs to be performed. The EC routine could be performed by hardware or firmware.

At block 708, the process corrects the error using ECC, which could be performed by a firmware ECC or a hardware ECC. If an error is identified, the process transitions directly to block 710.

At block 710, the process examines whether there is any other ways to access the cache. If there are other ways, at block 712, the variable is incremented and processing transactions back to block 704.

If there are no more ways, at block 714, the process tests the corrected data stored in the cache to determine whether the data is correctable. At block 716, the process examines whether there are any more errors. If there are no more errors, then block 718, the process resumes the processor operation. If there are more errors, the processor signals to the OS or asserts an interrupt (e.g., BIN IT) and the hard error is logged.

In the foregoing detailed description, the method and apparatus of the present invention have been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

We claim:

1. A method comprising:
    identifying at least one soft error from information being accessed in a cache memory;
    suspending processor operations in response to the at least one soft error;
    invoking at least one error correction procedure to correct the at least one soft error, including calling a firmware procedure to correct the at least one soft error; and
    resuming the processor operations when the at least one soft error is corrected.

2. The method of claim 1, wherein the identifying the at least one soft error includes performing a parity check.

3. The method of claim 1, wherein the identifying the at least one soft error includes performing an error correcting code.

4. The method of claim 1, wherein the identifying the at least one soft error includes detecting an error from address, instruction, and data transactions.

5. The method of claim 1, wherein the identifying the at least one soft error includes detecting a parity error.

6. The method of claim 1, wherein the suspending the processor operation includes:
    flushing processing pipelines for preventing propagation of the at least one error;
    suspending operation of the cache memory;
    halting an external snooping processing; and
    logging an error message.

7. The method of claim 1, wherein the invoking the at least one error correction procedure to correct the at least one soft error includes calling a hardware procedure to correct the at least one soft error.

8. The method of claim 1, further comprising:
    writing corrected data to the cache memory; and
    writing the corrected data to a register.

9. The method of claim 1, further comprising issuing a message indicating a hard error if the at least one soft error is not correctable.

10. A processor comprising:
    a cache memory;
    at least one execution unit coupled to the cache memory; and a device coupled to the cache memory to detect at least one error from information transferred between the cache memory and the at least one execution unit, wherein the device suspends operation of the execution unit and invokes at least one error correcting procedure to correct the at least one error in response to a detection of the at least one error.

11. The processor of claim 10, wherein the cache memory is a level 0 ("L0") cache.

12. The processor of claim 10, wherein the device comprises a parity check circuit.

13. The processor of claim 10, further comprising a memory coupled to the cache memory to store an error recovering firmware, wherein the error recovering firmware performs the at least one error correcting procedure to recover the at least one error.

14. The processor of claim 10, further comprising an error correcting circuit to correct the at least one error.

15. A machine-readable medium that provides instructions that, if executed by a processor, will cause the processor to perform operations comprising:
   identifying at least one error from information being accessed in a cache memory, wherein identifying the at least one error comprises
      fetching a block of code from a storage location,
      generating at least one error detection code according to the block of code,
      comparing the at least one error detection code with a first error detection code stored in a first field of an entry of a memory if a block tag of the block of code matches with a tag stored in a second field of the entry of the memory, and
      issuing an error message in response to a determination that the at least one error detection code mismatches with the first error detection code stored in the first field of the entry; and
   suspending processor operation in response to the error message.

16. The machine-readable medium of claim 15, wherein the instructions cause the processor to further perform:
   writing corrected data to the cache memory; and
   writing the corrected data to a register.

17. The machine-readable medium of claim 15, wherein the identifying the at least one error further includes performing a parity check.

18. The machine-readable medium of claim 15, wherein identifying the at least one error further includes performing an error correcting code.

19. The machine-readable medium of claim 15, wherein the identifying the at least one error further includes detecting an error from address, instruction, and data transactions.

20. The machine-readable medium of claim 15, wherein identifying the at least one error from the information transferred further includes detecting a parity error.

21. The machine-readable medium of claim 15, wherein the instructions cause the processor to further perform:
   flushing processing pipelines for preventing propagation of the at least one error;
   suspending operation of the cache memory;
   halting external snooping process; and
   logging the error message.

22. The machine-readable medium of claim 15, wherein the instructions cause the processor to further perform invoking the at least one error correction procedure to correct the at least one error, the at least one error correction procedure including a firmware procedure.

* * * * *